US011740425B2

(12) United States Patent
Faraj et al.

(10) Patent No.: US 11,740,425 B2
(45) Date of Patent: Aug. 29, 2023

(54) MULTIFIBER INVISIBLE OPTICAL DROP CABLE AND METHODS FOR ROUTING OPTICAL FIBERS WITHIN A MULTI-DWELLING UNIT

(71) Applicant: CORNING RESEARCH & DEVELOPMENT CORPORATION, Corning, NY (US)

(72) Inventors: Patrick Faraj, Berlin (DE); Marcin Kusmierek, Lodz (PL); Gordon Mueller-Schlomka, Berlin (DE)

(73) Assignee: Corning Research & Development Corporation, Corning, NY (US)

( * ) Notice: Subject to any disclaimer, the term of this patent is extended or adjusted under 35 U.S.C. 154(b) by 106 days.

(21) Appl. No.: 17/038,350

(22) Filed: Sep. 30, 2020

(65) Prior Publication Data

US 2021/0181452 A1    Jun. 17, 2021

Related U.S. Application Data

(60) Provisional application No. 62/924,792, filed on Oct. 23, 2019.

(51) Int. Cl.
*G02B 6/50* (2006.01)
*G02B 6/44* (2006.01)

(52) U.S. Cl.
CPC ......... *G02B 6/4466* (2013.01); *G02B 6/4473* (2013.01); *G02B 6/4495* (2013.01); *G02B 6/50* (2013.01); *G02B 6/4475* (2013.01)

(58) Field of Classification Search
CPC .. G02B 6/4466; G02B 6/4473; G02B 6/4475; G02B 6/4495; G02B 6/50
See application file for complete search history.

(56) References Cited

U.S. PATENT DOCUMENTS 8,295,670 B2 * 10/2012 Berglund ............. G02B 6/4466
  385/139
8,842,960 B2 * 9/2014 Berglund ............. G02B 6/4459
  385/136

(Continued)

FOREIGN PATENT DOCUMENTS

DE   102015102897 A1   9/2016
EP       0683032 A2   11/1995
WO    2008/080518 A1   7/2008

OTHER PUBLICATIONS

3M Science, "3M™ Clear Track Fiber Pathway", Communication Markets Division, 2018, 4 pages.

(Continued)

*Primary Examiner* — Daniel Petkovsek

(57) ABSTRACT

The present disclosure relates to a process by which an optical fiber drop cable is created and routed in a multiple dwelling unit ("MDU"). The optical fiber drop cable is formed with a feeding tool, and the optical fiber drop cable includes a tube having optical fibers enclosed within the tube. The feeding tool creates a slit within the tube through which optical fibers are fed and thereby inserted into the tube along the tube's length. Once the tube exits the feeding tool with the optical fibers enclosed (thereby forming the optical fiber drop cable), the optical fiber drop cable is then routed into an individual dwelling unit of the MDU by a transition assembly including a transition plug and a routing plug that leads an optical fiber from an exterior of the individual dwelling unit to a subscriber termination point in an interior of the individual dwelling unit.

8 Claims, 14 Drawing Sheets

(56) References Cited

U.S. PATENT DOCUMENTS

| | | |
|---|---|---|
| 9,791,656 B2 | 10/2017 | Marius Goleret et al. |
| 2010/0247052 A1 | 9/2010 | Berglund et al. |
| 2016/0358697 A1 | 12/2016 | Soerensen |
| 2017/0363832 A1* | 12/2017 | Mullaney ............. G02B 6/4471 |

OTHER PUBLICATIONS

3M Science, "3M™ Clear Track Fiber Pathway", Installation Instructions, Jul. 2016, 12 pages.
Partial European Search Report for European Patent Application No. 20202077.2, dated Jan. 11, 2021, 15 pages.
PPC, "Zipper Tool for Fiber Protection", available online at <https://web.archive.org/web/20171109034140/https://www.ppc-online.com/zipper-tool-for-fiber-protection>, 2017, 5 pages.
European Patent Application No. 20202077.2, Extended European Search Report dated Apr. 15, 2021; 15 pages; European Patent Office.

* cited by examiner

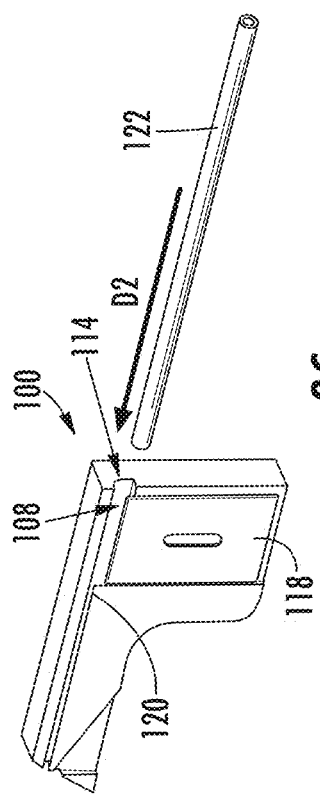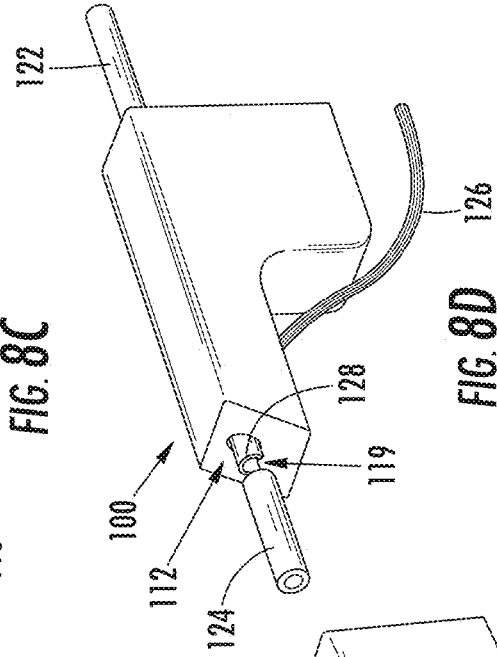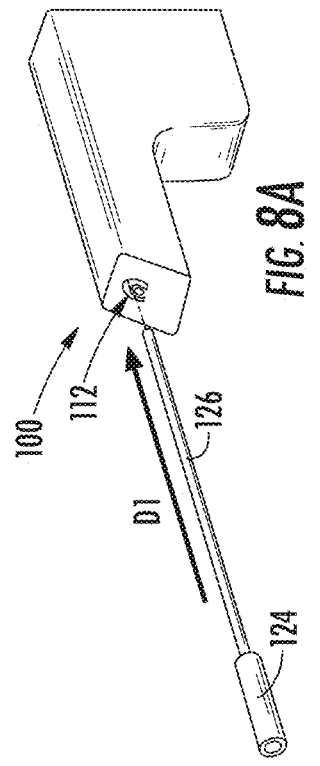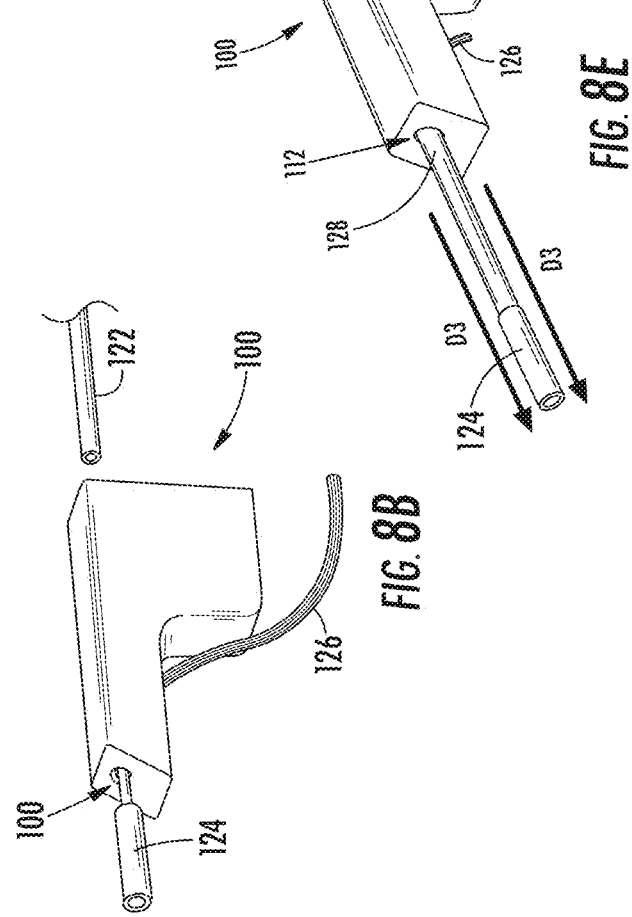

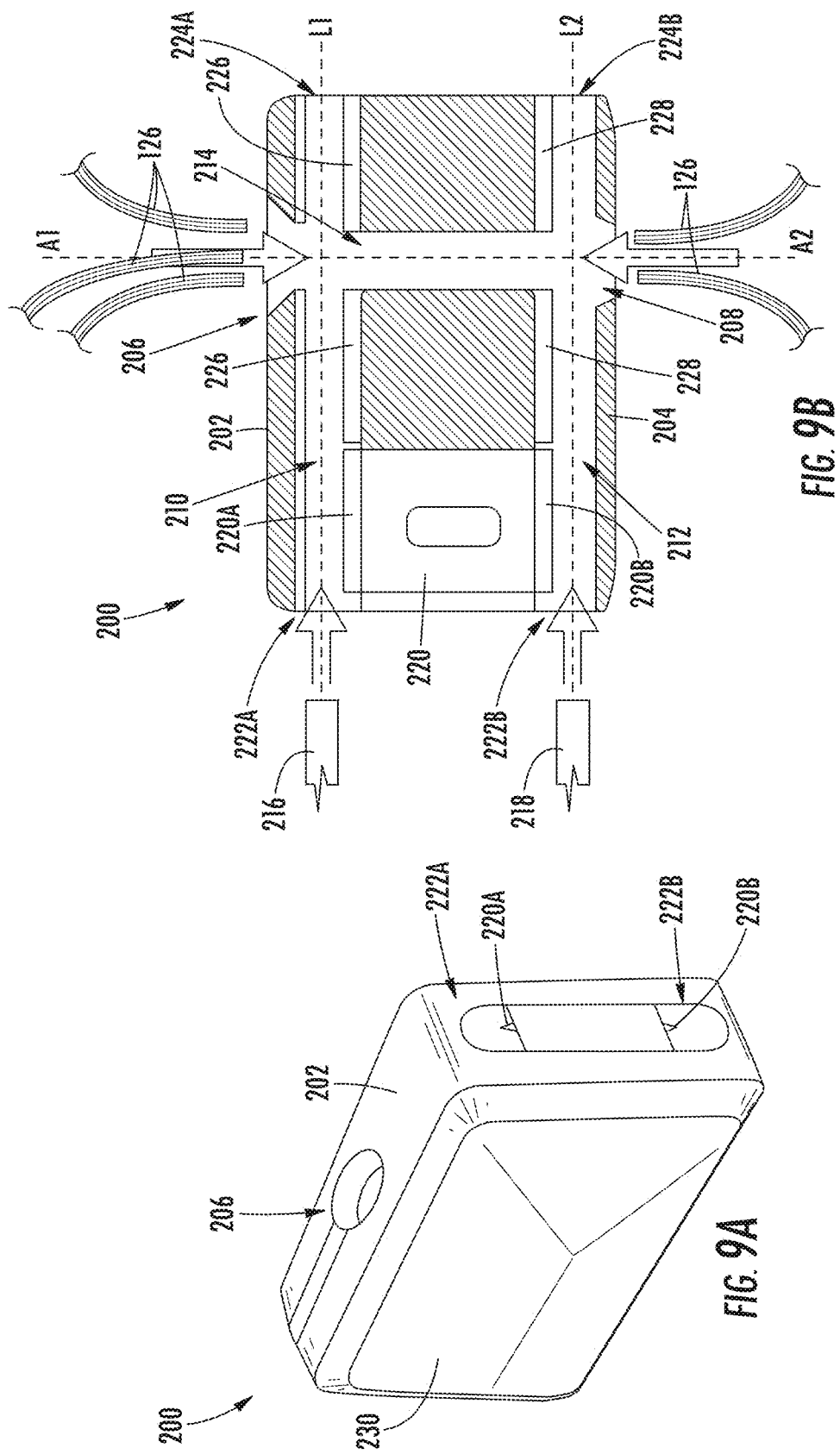

MULTIFIBER INVISIBLE OPTICAL DROP CABLE AND METHODS FOR ROUTING OPTICAL FIBERS WITHIN A MULTI-DWELLING UNIT

PRIORITY APPLICATION

This application claims the benefit of priority of U.S. Provisional Application No. 62/924,792, filed on Oct. 23, 2019, the content of which is relied upon and incorporated herein by reference in its entirety.

FIELD OF THE DISCLOSURE

This disclosure relates generally to optical fiber cable processing, and more particularly, to optical fiber cable processing for a multiple dwelling unit ("MDU").

BACKGROUND OF THE DISCLOSURE

Optical fibers are commonly used for voice, video, and data transmissions in many different settings each of which can pose installation challenges. In the installation of optical fibers in a multiple dwelling unit ("MDU") (e.g., apartment buildings, hotels, etc.), there is typically a need to route optical fibers between various pieces of equipment. For example, referring to FIG. 1, a conventional MDU 10 is provided having a basement B1 and floors A, B, C with individual dwelling units A1-A3, B1-B3, and C1-C3 included in floors A, B, and C, respectively. As shown, a main terminal 26 is located in basement B1 and is connected to a distribution cable 28, which houses optical fiber(s) 30. Fiber distribution terminals (FDT) 36 are located on each floor A, B, C, and subscriber optical fibers 32 extend from main terminal 26 to one or more of the FDTs 36. Thus, the subscriber optical fibers 32 can be grouped between main terminal 24 and the FDT 36s, with one or more of the subscriber optical fibers 32 being separated from the other subscriber optical fibers at a given FDT 36.

From FDTs 36, multiple subscriber drop optical fibers 38 are routed to subscriber termination points 34 (e.g., an adapter in a wall outlet, an adapter in a floor panel, an adapter behind a ceiling tile, or the like) such that the subscriber can optically connect directly (or indirectly in some situations) to the subscriber optical fiber 32) into each dwelling unit A1-A3, B1-B3, and C1-C3 of MDU 10.

One challenge that exists in installing optical fibers in an MDU is the resulting aesthetics of the housings or receptacles used to route the fiber optic cables (e.g., the FDTs and subscriber termination points 34 in FIG. 1). These units can be visible and/or may be inconveniently placed within the MDU. Another challenge is the availability/creation of pathways for optical fiber drop cables. That is, there may not be enough molding available throughout the MDU to create hidden pathways, or the molding available may not affix onto every surface which can lead to the visibility of optical fiber cables within the MDU. Additionally, optical fibers can be difficult to manage/maintain due to the risk of incurring damage and need for protection.

SUMMARY OF THE DISCLOSURE

The present disclosure relates to a process by which an optical fiber drop cable is created and routed in a multiple dwelling unit ("MDU"). The optical fiber drop cable is formed with a feeding tool, and the optical fiber drop cable includes a tube having optical fibers enclosed within the tube. The feeding tool creates a slit within the tube through which optical fibers are fed and thereby inserted into the tube along the tube's length. Once the tube exits the feeding tool with the optical fibers enclosed (thereby forming the optical fiber drop cable), the optical fiber drop cable is then routed into an individual dwelling unit of the MDU by a transition assembly including a transition plug and a routing plug that leads an optical fiber from an exterior of the individual dwelling unit to a subscriber termination point in an interior of the individual dwelling unit.

In one embodiment, a method of preparing and routing a plurality of optical fibers within a multiple dwelling unit ("MDU") is provided. The method comprises: preparing an optical fiber drop cable by: creating a slit along a length of a tube; and directing the plurality of optical fibers through the slit such that the plurality of optical fibers extend within the tube along the length; arranging a transition plug on the optical fiber drop cable at a first location by: extending the optical fiber drop cable through a routing channel that extends through the transition plug, wherein the transition plug also includes a transition channel that communicates with the routing channel; and extracting at least one optical fiber from within the tube using the slit and extending the at least one optical fiber through the transition channel of the transition plug; routing the at least one optical fiber from the transition plug into a first dwelling unit of the MDU by extending the at least one optical fiber through a wall of the MDU; and mounting the transition plug to an exterior side of the wall of the MDU.

In another embodiment, routing the at least one optical fiber from the transition plug into the first dwelling unit of the MDU comprises extending the at least one optical fiber through a routing plug secured to the wall; and mounting the transition plug to the exterior of the wall comprises coupling the transition plug to the routing plug to form a transition assembly that traverses the wall and provides a pathway for the at least one optical fiber from the exterior side of the wall to the interior side of the wall. In another embodiment, the routing plug includes an entry channel extending from the interior side of the wall, and wherein the entry channel communicates with the transition channel of the transition plug when the transition assembly is formed. In another embodiment, routing the at least one optical fiber from the transition plug into the first dwelling unit of the MDU is performed before coupling the transition plug to the routing plug.

In yet another embodiment, the transition plug arranged at the first location on the optical fiber drop cable is a first transition plug, the at least one optical fiber routed into the first dwelling unit is at least one first optical fiber, and the wall of the MDU is a first wall, the method first comprising: arranging a second transition plug on the optical fiber drop cable at a second location, wherein the second transition plug is similar to the first transition plug and arranged on the optical fiber drop cable in a similar manner such that, after arranging the second transition plug, at least one second optical fiber is extracted through the slit of the tube and extends through the transition channel of the second transition plug; and routing the at least one second optical fiber from the second transition plug into a second dwelling unit of the MDU by extending the at least one second optical fiber through the first wall of the MDU or a different wall of the MDU.

In another embodiment, preparing the optical fiber drop cable further comprises: inserting the plurality of optical fibers into a first portion of a feeding tool; inserting the tube into a second portion of a feeding tool; and causing relative movement between the tube and the feeding tool so that a blade of the feeding tool creates the slit along the length of the tube, wherein the feeding tool directs the plurality of optical fibers through the slit and into the tube during the relative movement. In another embodiment, the feeding tool further includes a wedge structure configured to engage with the tube and open the slit of the tube such that the plurality of optical fibers can be directed through the slit. In another embodiment, the feeding tool includes a front aperture and a rear aperture between which passage is defined, wherein the wedge structure is proximate the front aperture. In another embodiment, the wedge structure is integrally formed with a body of the feeding tool.

In one embodiment, a method of preparing and routing fibers within a multiple dwelling unit ("MDU") that includes at least one dwelling unit is provided. The method comprising: preparing at least one optical fiber drop cable by: inserting at least one optical fiber into a feeding tool, wherein the feeding tool includes a blade and at least one passage, the blade protruding into the at least one passage; inserting a tube into the at least one passage such that the blade creates a slit in the tube; directing the at least one optical fiber into the slit of the tube to create the at least one optical fiber drop cable, wherein the at least one optical fiber extends along a length of the at least one optical fiber drop cable; inserting the at least one optical fiber drop cable into a transition plug by: inserting the at least one optical fiber drop cable into a routing channel of the transition plug; extracting at least one optical fiber from the at least one optical fiber drop cable and inserting the at least one optical fiber into a transition channel of the transition plug such that the at least one optical fiber protrudes from the transition plug; inserting the transition plug into a wall of the at least one dwelling unit such that the at least one optical fiber extends into the at least one dwelling unit; and coupling a routing plug to the transition channel of the transition plug such that the transition plug and the at least one optical fiber that has been inserted into the transition channel are securely mounted to the wall, wherein the routing plug includes anchor structures to engage the routing plug within the wall.

In one embodiment, the feeding tool includes: a body including a first surface and a second surface positioned opposite the first surface; a first aperture positioned on the first surface and configured to receive a first optical fiber; a second aperture positioned on the second surface and positioned opposite the first aperture, the second aperture configured to receive a second optical fiber; and an internal passage between the first aperture and the second aperture, the internal passage configured to route the first optical fiber and the second optical fiber within the body. In another embodiment, the at least one passage of the feeding tool includes: a first passage and a second passage each within the feeding tool and each defined by the body, the second passage spaced apart from the first passage; wherein both the first passage and the second passage intersect the internal passage; and the blade is positioned within the body such that the blade extends into both the first passage and the second passage.

In another embodiment, preparing the at least one optical fiber drop cable further includes: inserting at least one first optical fiber into the first aperture; inserting at least one second optical fiber into the second aperture; inserting a first tube into the first passage whereby the blade creates a first slit in the first tube as the first tube is inserted into the first passage; inserting a second tube into the second passage whereby the blade creates a second slit in the second tube as the second tube is inserted into the second passage; directing the at least one second optical fiber through the internal passage and into the first slit of the first tube such that the at least one second optical fiber is within the first tube when the first tube exits the feeding tool to form a first optical fiber drop cable; and directing the at least one first optical fiber through the internal passage and into the second slit of the second tube such that the at least one first optical fiber is within the second tube when the second tube exits the feeding tool to form a second optical fiber drop cable.

In another embodiment, the feeding tool further includes: a first wedge structure extending into the first passage; a second wedge structure extending into the second passage; and wherein the first wedge structure and the second wedge structure are configured to open the respective first and second slits of the first tube and the second tube such that the at least one first optical fiber and the at least one second optical fiber can be inserted into the second tube and the first tube, respectively. In another embodiment, the first passage and the second passage have different sizes to accommodate different sizes of the first tube and the second tube. In another embodiment, the routing plug includes an entry channel coaxial with the transition channel, the routing plug configured to guide the at least one optical fiber into the at least one dwelling unit, and wherein the routing plug and the transition plug are telescopically mated such that the transition assembly can engage with and accommodate different wall thicknesses. In another embodiment, the transition channel of the transition plug includes a plurality of protrusions to engage with the routing plug. In another embodiment, the routing plug covers the transition channel of the transition plug such that the transition channel is within the entry channel of the routing plug. In another embodiment, the routing channel is substantially perpendicular to the transition channel. In another embodiment, the routing plug contacts an interior of the wall of the at least one dwelling unit and the transition plug contacts the exterior of the wall.

In one embodiment, a system for preparing and routing a plurality of optical fibers within a multiple dwelling unit ("MDU") is provided. The system comprising: a tube for receiving the plurality of optical fibers; a feeding tool having a body, a passage extending through the body, and a blade extending into the passage, wherein: the passage is configured to receive the tube; the blade is configured to create slit in the tube when the tube is received in the passage; and the body is configured to direct the plurality of optical fibers through the slit and into the tube to form an optical fiber drop cable when there is relative movement between the feeding tool and the tube; a transition plug configured to be arranged on the optical fiber drop cable at a first location, the transition plug including: a routing channel for allowing the optical fiber drop cable to extend through the transition plug; a transition channel that communicates with the routing channel so that the transition channel can receive at least one optical fiber extracted through the slit of the tube; and a routing plug configured to couple with the transition channel of the transition plug to provide an entry channel that is coaxial with the transition channel.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIGS. 8A-8E are perspective views of the feeding tool of FIG. 2 that illustrate a method of assembling an optical fiber drop cable using the feeding tool;

FIG. 9A is a perspective view of an alternate embodiment of a feeding tool in accordance with the present disclosure;

FIG. 9B is a cross sectional view of the feeding tool of FIG. 9A illustrating the internal components of the feeding tool;

DETAILED DESCRIPTION

Figure 1:
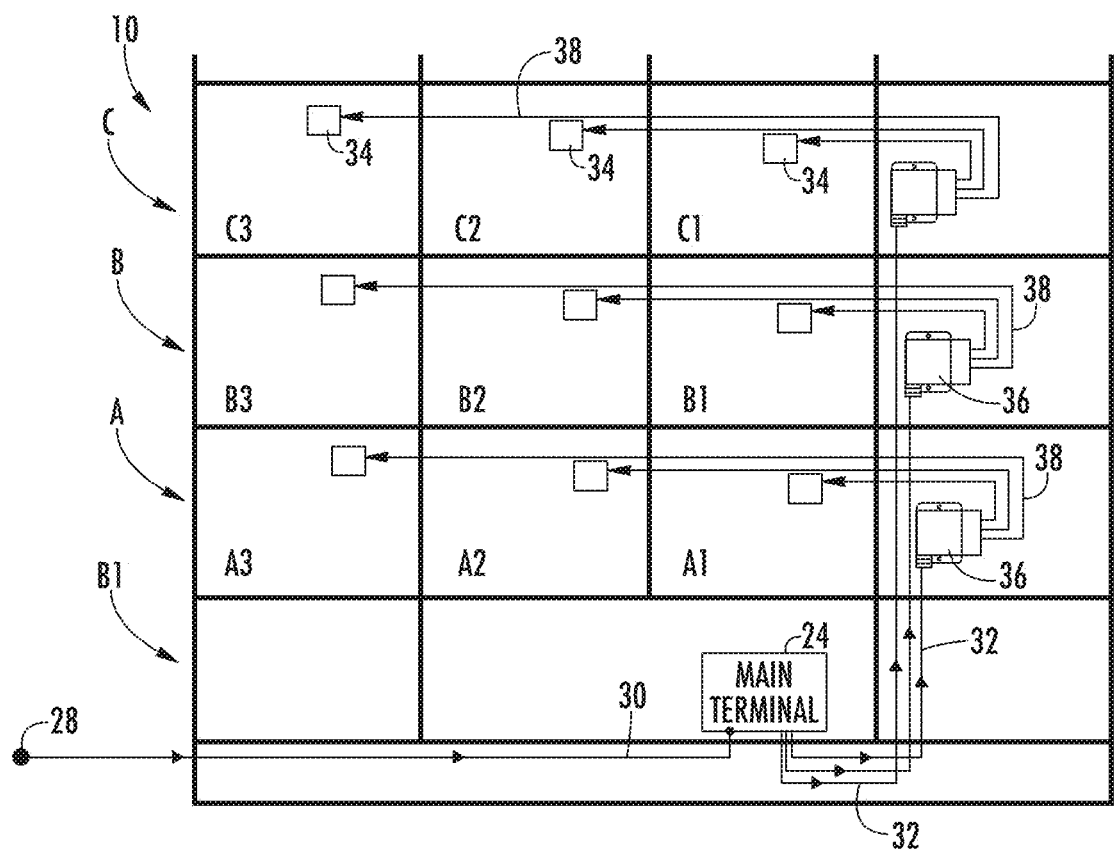
FIG. 1 is a schematic view of a conventional multiple dwelling unit ("MDU") optical fiber routing map that includes a main terminal and associated fiber optic hardware, illustrating optical signal routing from a distribution cable to a main terminal via a cable assembly optical fiber to the main terminal, then to a fiber distribution terminal (FDT) via a subscriber optical fiber, and finally to a subscriber termination point via a subscriber drop optical fiber.

Various embodiments will be clarified by examples in the description below. In general, the present disclosure relates to a process by which an optical fiber drop cable is created and routed in a multiple dwelling unit ("MDU"). The optical fiber drop cable is formed with a feeding tool, and the optical fiber drop cable includes a tube and optical fibers enclosed within the tube. The feeding tool creates a slit within the tube through which the optical fibers are fed and thereby inserted into the tube along the tube's length. Once the tube exits the feeding tool with the optical fibers enclosed (thereby forming the optical fiber drop cable), the optical fiber drop cable is then routed into an individual dwelling unit of the MDU by a transition assembly that leads an optical fiber from an exterior of the individual dwelling unit to a subscriber termination point in an interior of the individual dwelling unit.

Examples of feeding tools will be described first below, followed by a more detailed discussion of the method referred to above. It will be appreciated that feeding tools having different configurations may be used to achieve similar results. Thus, the methods in this disclosure are not tied to particular configurations of feeding tools except as set out in the claims that follow the description below.

Feeding Tool Used for Creating Optical Fiber Drop Cable

Referring to FIGS. 2-5, various views of one embodiment of a feeding tool 100 are shown. Feeding tool 100 is configured to create an optical fiber drop cable 128 (FIG. 11), as will be discussed in greater detail below, and includes a body 102, side cover 104, and top cover 106, which removably couple to one another to form feeding tool 100 having a passage 108.

As shown in FIGS. 2-6, body 102 substantially gives feeding tool 100 an L-shaped configuration. However, it is contemplated that in other embodiments, other suitable shapes for feeding tool 100 may be used. Body 102 is also contoured to form a portion of passage 108, which longitudinally extends through feeding tool 100 from a front opening 112 to a rear opening 114.

Figure 2:
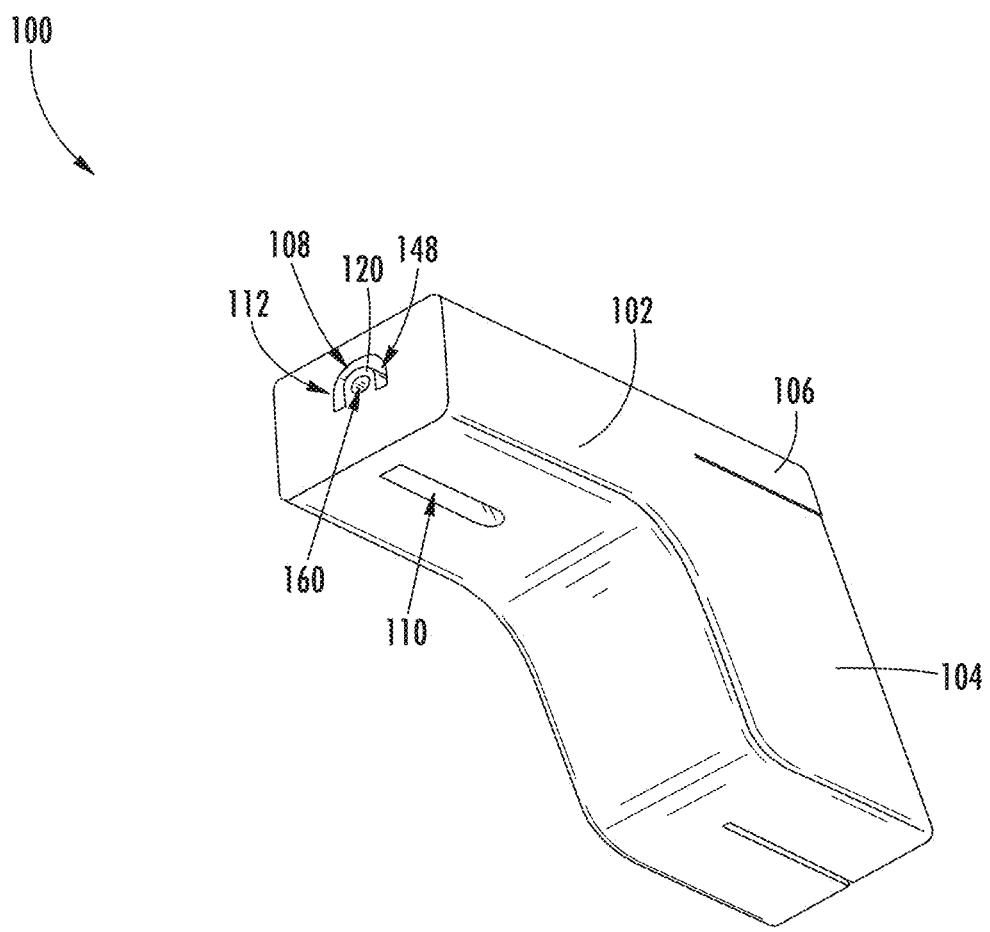
FIG. 2 is a bottom, perspective view of a feeding tool in accordance with the present disclosure.
Figure 3:
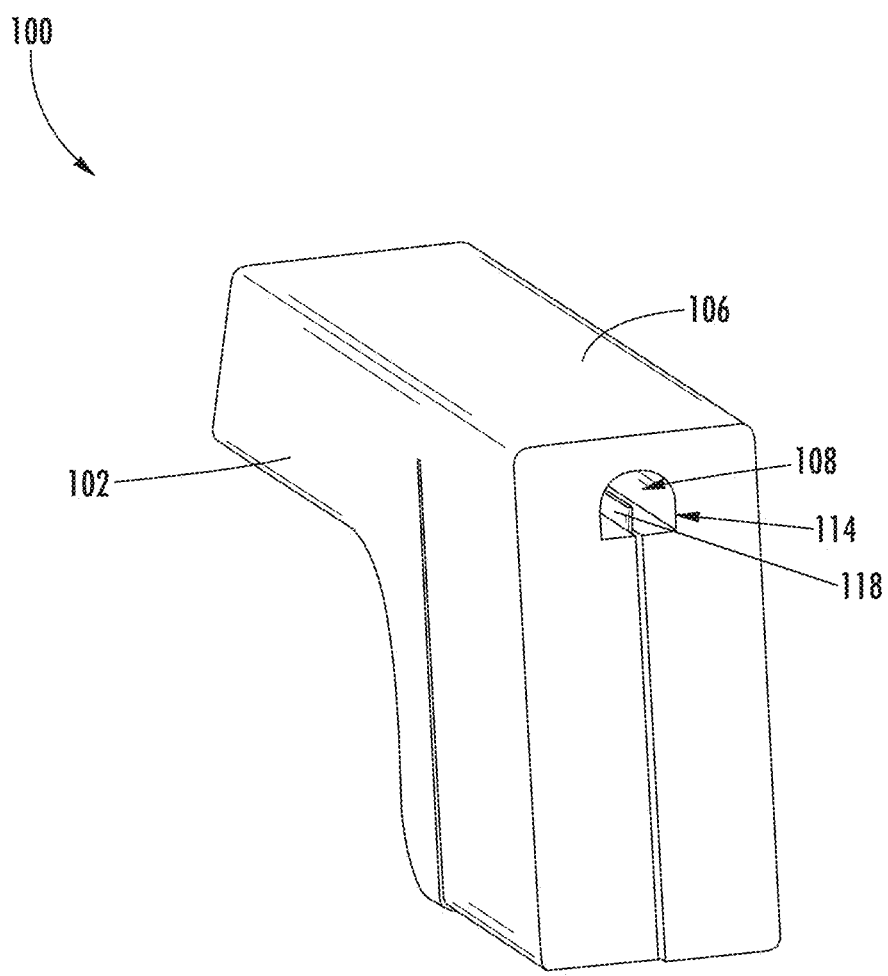
FIG. 3 is a rear, perspective view of the feeding tool of FIG. 2.

Feeding tool 100 also includes a feeding channel 160 extending from front opening 112 to aperture(s) 110 in a first portion of body 102 as shown in at least FIG. 2. Thus, front opening 112 serves as an opening for both passage 108 and feeding channel 160 (the former portion of front opening 112 will be referred to as "outer opening" and is labeled with reference number 148). Aperture(s) 110 in the first portion of body 102 enable optical fiber(s) to be fed from front opening 112 and through the first portion of body 102. In another embodiment, optical fiber(s) are fed from aperture(s) 110 and then through feeding channel 160 to front opening 112 when creating optical fiber drop cables as discussed further herein.

Figure 6:
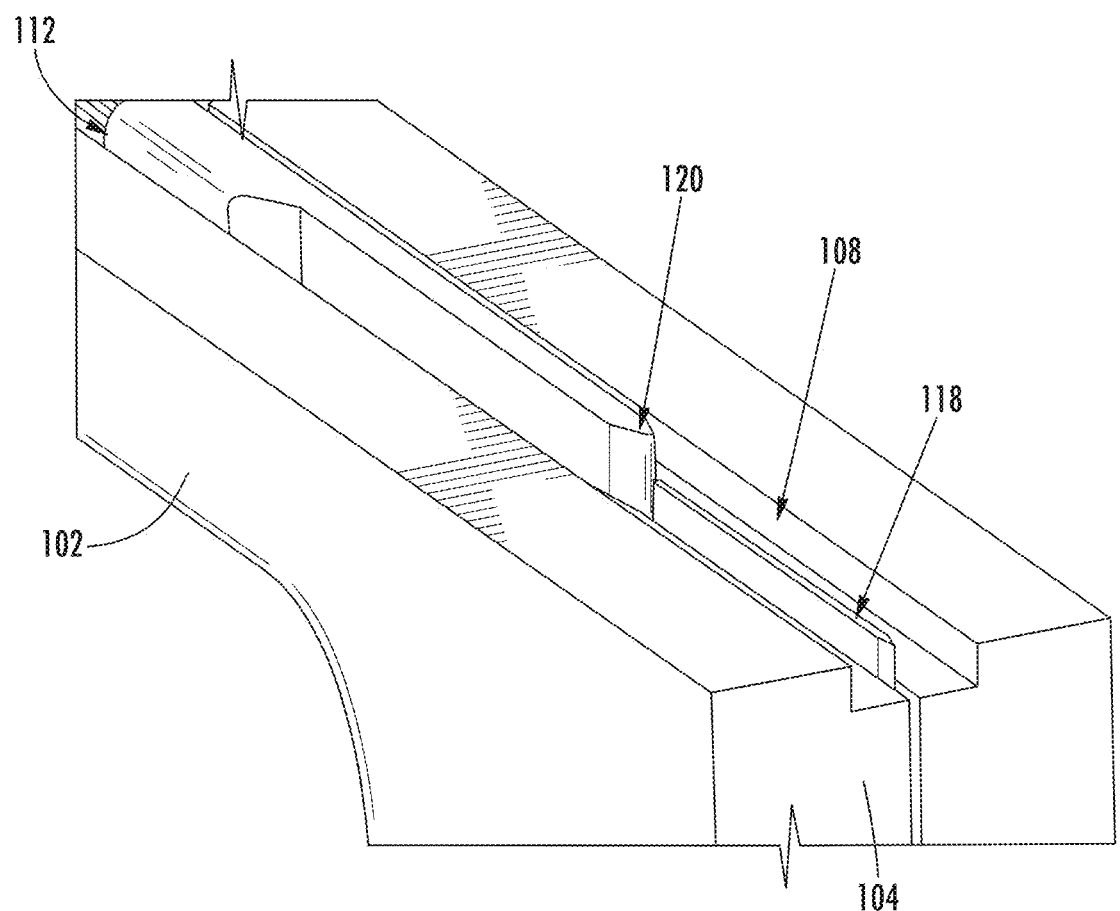
FIG. 6 is a perspective view of a portion of a passage of the feeding tool of FIG. 2.

As shown in FIG. 6, a blade 118 protrudes into passage 108, and a wedge structure 120 that is integrally formed with body 102 is located in passage 108 as well. Wedge structure 120 spans the distance from an end of blade 118 to front opening 112 and is configured to maintain or enlarge a slit 119 (FIG. 7) of tube 122 as tube 122 advances through passage 108, as will be discussed further below.

As mentioned previously, wedge structure 120 extends within passage 108 to front opening 112. As shown in at least FIG. 2, wedge structure 120 defines a portion of feeding channel 160 extending from front opening 112.

As mentioned previously, feeding channel 160 is in fluid communication with apertures 110 and functions to receive optical fiber(s). In addition, feeding channel 160 cooperates with apertures 110 to provide an insertion pathway for optical fiber(s) into slit 119 of tube 122 as discussed herein.

Outer opening 148 is defined primarily by top cover 106 and wedge structure 120. As will be described in greater detail below, tube 122 can be fed through rear opening 114 and pushed through passage 108 to ultimately exit feeding tool 100 via outer opening 148.

Figure 4:
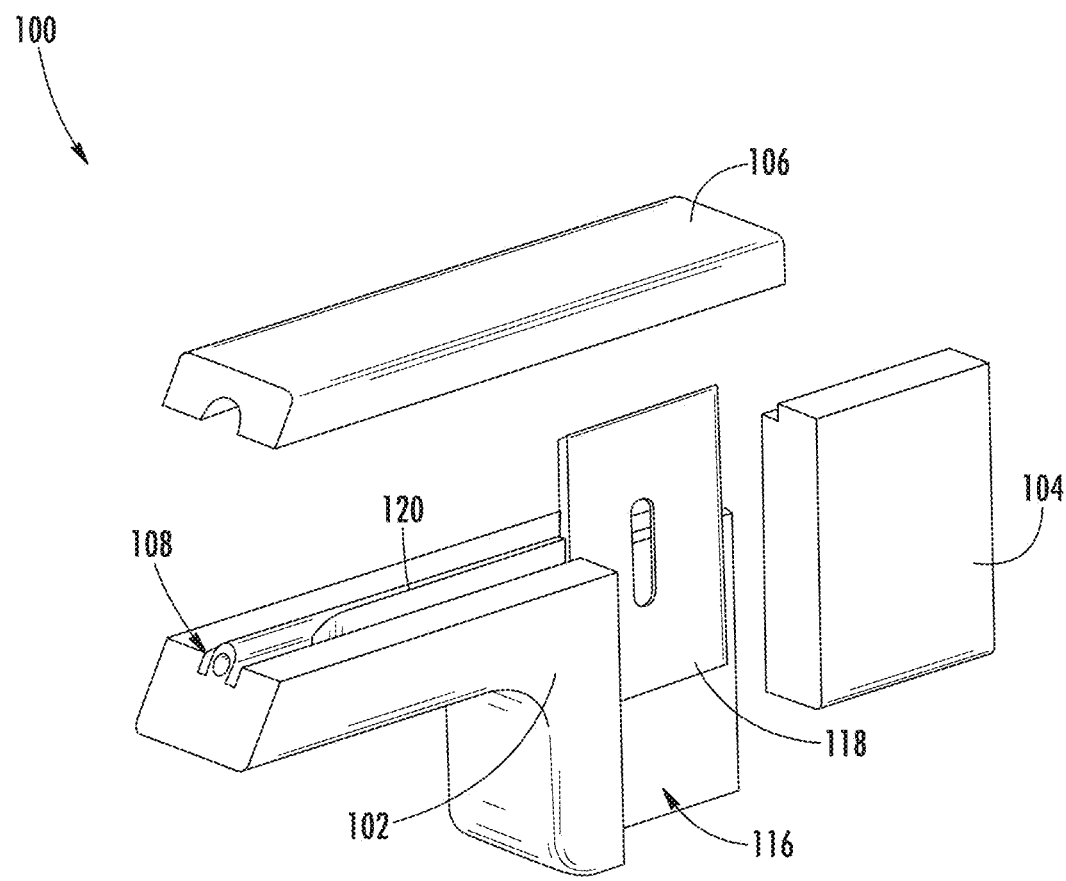
FIG. 4 is an exploded, perspective view of the feeding tool of FIG. 2 illustrating the interior components of the feeding tool.
Figure 5:
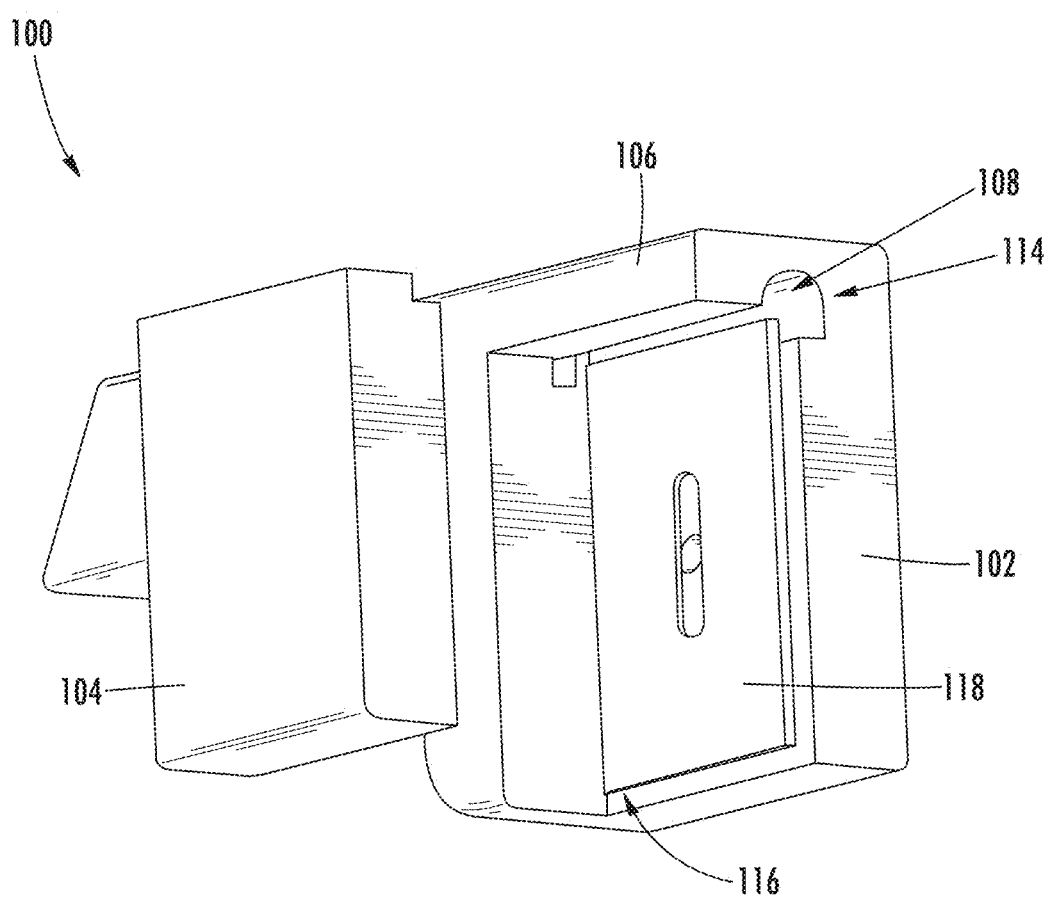
FIG. 5 is a side perspective view of the feeding tool of FIG. 2 with a side cover separated from the feeding tool.
Figure 7:
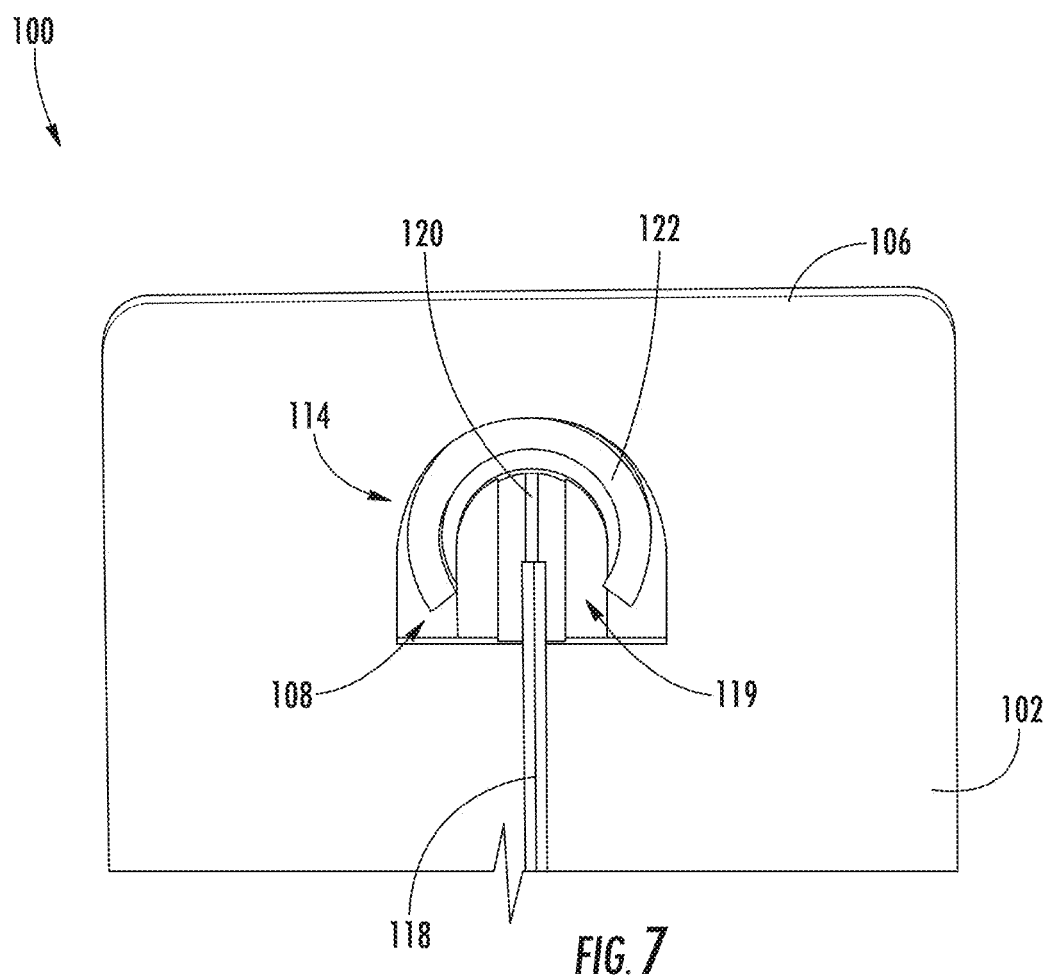
FIG. 7 is a rear view of a portion of the feeding tool of FIG. 2 with a tube inserted into the passage of the feeding tool.

As shown in FIG. 4, body 102 also includes a recessed section 116 adjacent to passage 108 in a second portion of body 102. Recessed section 116 is configured to receive a blade 118 and a side cover 104. Blade 118 is seated within recessed section 116 of body 102 and protrudes into passage 108 when coupled to side cover 104 and body 102 as shown in FIGS. 5-7. Blade 118 is positioned adjacent rear opening 114 and functions to create a slit 119 within tube 122 (FIGS. 8B-8D) as tube 122 is inserted into the second portion of feeding tool 100 via rear opening 114.

As mentioned previously, side cover 104 is seated within recessed section 116 and couples to body 102 to further define the shape of passage 108. That is, when side cover 104 is coupled to body 102, a lower boundary of passage 108 is defined such that the shape of the lower boundary of passage 108 longitudinally extends throughout a length of feeding tool 100. As also mentioned previously, when side cover 104 is seated within recessed section 116 and coupled to body 102, side cover 104 cooperates with body 102 to hold blade 118 therebetween.

Top cover 106 is seated on body 102 and side cover 104 to further define an upper boundary of passage 108 and to provide a protective cover for passage 108. The installation of top cover 106 onto feeding tool 100 also defines the upper and lower boundaries of front opening 112 and the upper and lower boundaries (cooperating with side cover 104) of rear opening 114.

Front opening 112 is configured to receive one or more optical fibers (e.g., optical fiber(s) 126 in FIGS. 8A-8E) fed through feeding channel 160 and a tube 122 fed through passage 108, as discussed further in the next section of this description. Optical fiber(s) 126 may include a buffer tube or a buffer coating applied onto the optical fiber. For the purposes of the present disclosure, references to "optical fiber" include any of the aforementioned optical fiber constructions (i.e., with or without the application of a buffer tube and/or a coating).

Method of Using Feeding Tool to Create Optical Fiber Drop Cable

Referring now to FIGS. 7 and 8A-8E, a method of creating optical fiber drop cables 128 is shown. Referring first to FIG. 8A, a cap 124 is installed onto one end of optical fibers 126 and provides a protective covering for optical fibers 126. Element 126 can be considered to represent a single optical fiber or multiple optical fibers, and is therefore referred to in this disclosure as "optical fiber(s) 126". The other end of optical fiber(s) 126 is inserted into feeding channel 160 via front opening 112 along direction D1 as shown. As can be appreciated from FIG. 8B, optical fiber(s) 126 is routed through feeding channel 160 to exit aperture 110 (FIG. 2). In an alternate embodiment, optical fiber(s) 126 can be fed through feeding tool 100 in an opposite manner, i.e., first being routed through aperture 110 until one end of the optical fiber(s) 126 protrudes from feeding channel 160 via front opening 112 or other apertures along top cover 106 (not shown). In such alternate embodiments, the protruding ends of optical fiber(s) 126 can be coupled to each other by an adhesive (e.g., tape, etc.).

Then, with reference to FIGS. 8B and 8C, tube 122 is inserted into rear opening 114 of feeding tool 110 along direction D2. As tube 122 is inserted into rear opening 114 and into passage 108, blade 118 cuts tube 122 to create a slit 119 within tube 122 along a length of tube 122 as shown in FIGS. 7 and 8C. As tube 122 continues through passage 108 moving beyond blade 118, tube 122 engages with wedge structure 120 such that wedge structure 120 maintains or enlarges the opening of slit 119 as tube 122 moves through passage 108 and towards front opening 112.

Referring now to FIG. 8D, optical fiber(s) 126 extending from feeding channel 160 are inserted into enlarged slit 119 of tube 122 as tube 122 exits feeding tool 100 via front opening 112. Tube 122 also begins to disengage with wedge structure 120 such that enlarged slit 119 closes and reduces in size to substantially reform the original shape of tube 122. Tube 122 is then pulled in direction D3 as shown in FIG. 8E such that tube 122 disengages with wedge structure 120, substantially reverts to its original shape, and encompasses or encloses optical fiber(s) 126 along the length of tube 122 to form an optical drop cable 128.

Alternate Embodiment of Feeding Tool Used for Creating Optical Fiber Drop Cable

Referring now to FIGS. 9A and 9B, an alternate feeding tool 200 is shown. As shown, feeding tool 200 includes a body 230 forming dual passages 210, 212 such that two optical fiber drop cables 128 can be created with feeding tool 200. Feeding tool 200 includes a pair of front apertures 224A, 224B, a pair of rear apertures 222A, 222B, and respective first and second passages 210, 212 extending between the front apertures 224A, 224B and rear apertures 222A, 222B, respectively. First and second passages 210, 212 will be referred to as "upper and lower passages 210, 212" for convenience, given how feeding tool 200 appears in FIGS. 9A and 9B. As shown in FIG. 9B, upper passage 210 and lower passage 212 are spaced apart from each other and can have different sizes to accommodate tubes 216, 218 of different sizes. For example, as shown in FIG. 9B, upper passage 210 may be sized to accommodate a tube 216 having a first diameter (e.g., 4 microns), and lower passage 212 may be sized to accommodate a tube 218 having a second, larger diameter (e.g., 12 microns). However, it is within the scope of the present disclosure that other suitable sizes may be employed. In another embodiment, upper passage 210 and lower passage 212 are of the same size.

Feeding tool 200 also includes a top aperture 206 on a top surface 202 of feeding tool 200, and a bottom aperture 208 on a bottom surface 204 of feeding tool 200. Top aperture 206 and bottom aperture 208 are each configured to receive optical fiber(s) 126 which are then directed into one of tubes 216, 218 as discussed further herein. Top aperture 206 and bottom aperture 208 have axes A1 and A2, respectively, which are perpendicular to both longitudinal axes L1, L2 of upper passage 210 and lower passage 212. However, it is contemplated that in alternate embodiments top aperture 206 and bottom aperture 208 may be angled to one or both of longitudinal axes L1, L2.

Similar to upper passage 210 and lower passage 212, an internal passage 214 extends from top aperture 206 to bottom aperture 208. In particular, internal passage 214 extends from top aperture 206 to bottom aperture 208 such that internal passage 214 intersects and is in fluid communication with both upper passage 210 and lower passage 212. As discussed herein, internal passage 214 is configured to route optical fiber(s) 126 within the body of feeding tool 200 and into tubes 216, 218.

Similar to feeding tool 100, feeding tool 200 includes a blade 220 within body 230 and upper and lower wedge structures 226, 228 adjacent blade 220. As shown in FIG. 9B, blade 220 includes an upper blade segment 220A and a lower blade segment 220B. Upper blade segment 220A and lower blade segment 220B protrude into upper passage 210 and lower passage 212, respectively, and both blade segments 220A, 220B function to create a respective slit into tubes 216, 218 as tubes 216, 218 are fed into rear apertures 222A, 222B and are moved through upper passage 210 and lower passage 212.

Similar to wedge structure 120 of feeding tool 100, wedge structures 226, 228 are integrally formed with body 230 and are configured to maintain or enlarge the slits of tubes 216, 218 as tubes 216, 218 advance through passages 210, 212 and engage with wedge structures 226, 228 as discussed previously. This enables optical fiber(s) 126 to be directed into tubes 216, 218.

To create optical fiber drop cables using feeding tool 200, the steps are similar to those discussed previously with respect to feeding tool 100. Optical fibers 126 are first inserted into top aperture 206 and bottom aperture 208 and fed into internal passage 214. Once optical fibers 126 are inserted, tubes 216, 218 are inserted into respective rear apertures 222A, 222B and passages 210, 212. As tubes 216, 218 are moved through passages 210, 212, blade segments 220A, 220B create respective slits within tubes 216, 218. After blade 220, tubes 216, 218 move along respective passages 210, 212 and engage with respective wedge structures 226, 228 such that similar to wedge structure 120, wedge structures 226, 228 maintain or enlarge the opening of the slits of tubes 216, 218 as tubes 216, 218 move towards front apertures 224A, 224B.

When tubes 216, 218 pass internal passage 214, optical fiber(s) 126 are inserted into tubes 216, 218 via internal passage 214. More specifically, optical fiber(s) 126 that are inserted into top aperture 206 are inserted through internal passage 214 and into the enlarged slit of tube 218 in lower passage 212. Likewise, optical fiber(s) 126 that are inserted into bottom aperture 208 are inserted through internal passage 214 and into the enlarged slit of tube 216 in upper passage 210.

As tubes 216, 218 continue through respective upper passage 210 and lower passage 212 and exit front apertures 224A, 224B, tubes 216, 218 disengage with wedge structures 226, 228 and the corresponding enlarged slits of tubes 216, 218 close returning tubes 216, 218 to their substantially original shapes with optical fiber(s) 126 enclosed. Tubes 216, 218 are pulled through passages 210, 212 for their entire length (or for a desired length) such that upon exiting front apertures 224A, 224B, tubes 216, 218 encase optical fiber(s) 126 to form a pair of optical fiber drop cables 128 for use in an MDU.

Installation of Optical Fiber Drop Cables within a Multi-Dwelling Unit ("MDU")

Figure 12:
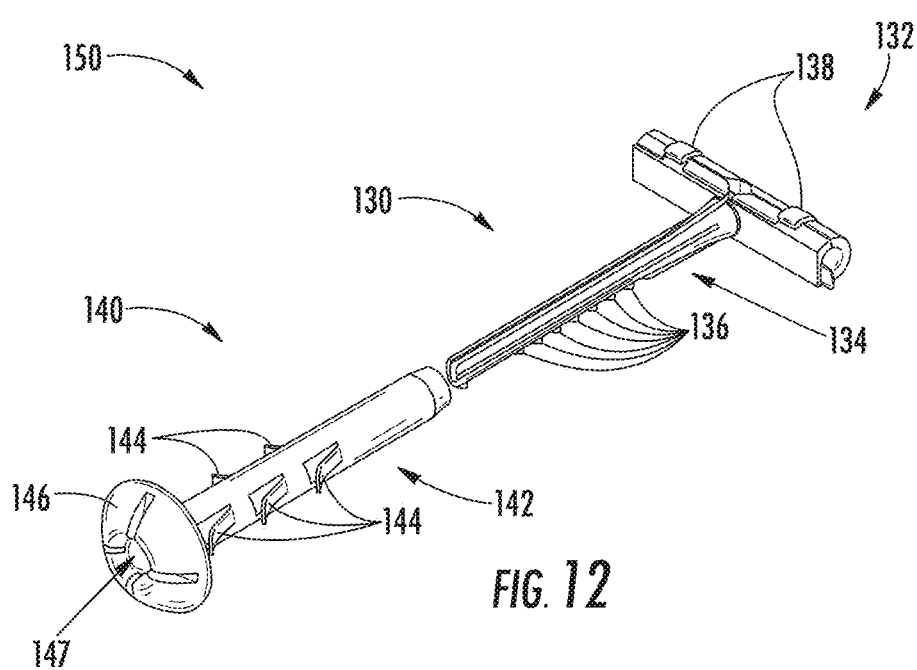
FIG. 12 is an exploded view of a transition assembly including the transition plug and a routing plug in accordance with the present disclosure.

Once optical fiber drop cables 128 are formed, optical fiber drop cables 128 are routed through a multi-dwelling unit ("MDU") (e.g., MDU 10A; see FIG. 14) and individual optical fibers 126 are routed into individual dwelling units (e.g., A1-A3, B1-B3, or C1-C3, etc.). In particular, a transition assembly 150 (FIGS. 12 and 13) may be used to route optical fiber drop cables 128 and individual optical fibers 126 throughout the MDU 10A. In the embodiment shown, transition assembly 150 comprises a transition plug 130 and a routing plug 140 that may be coupled together.

Figure 10:
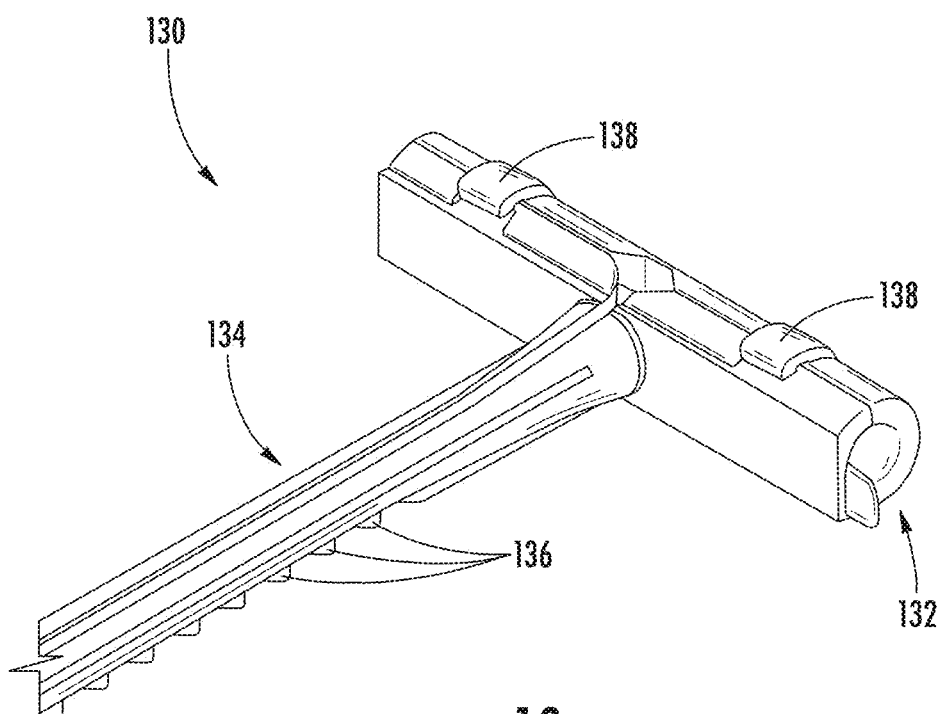
FIG. 10 is a perspective view of a transition plug used to route optical fiber drop cables in accordance with the present disclosure.

FIG. 10 illustrates transition plug 130 in isolation. Transition plug 130 functions to route optical fiber drop cables 128 (and individual optical fibers 126 enclosed therein) within MDU 10A in the vicinity of individual dwelling units (e.g., A1-A3, B1-B3, or C1-C3, etc.) of the MDU 10A. In particular, transition plug 130 routes optical fiber drop cables 128 on an exterior or "hallway" side (FIG. 13) of a dwelling unit and routes individual optical fiber(s) 126 towards the interior of the dwelling unit via routing plug 140.

Figure 11:
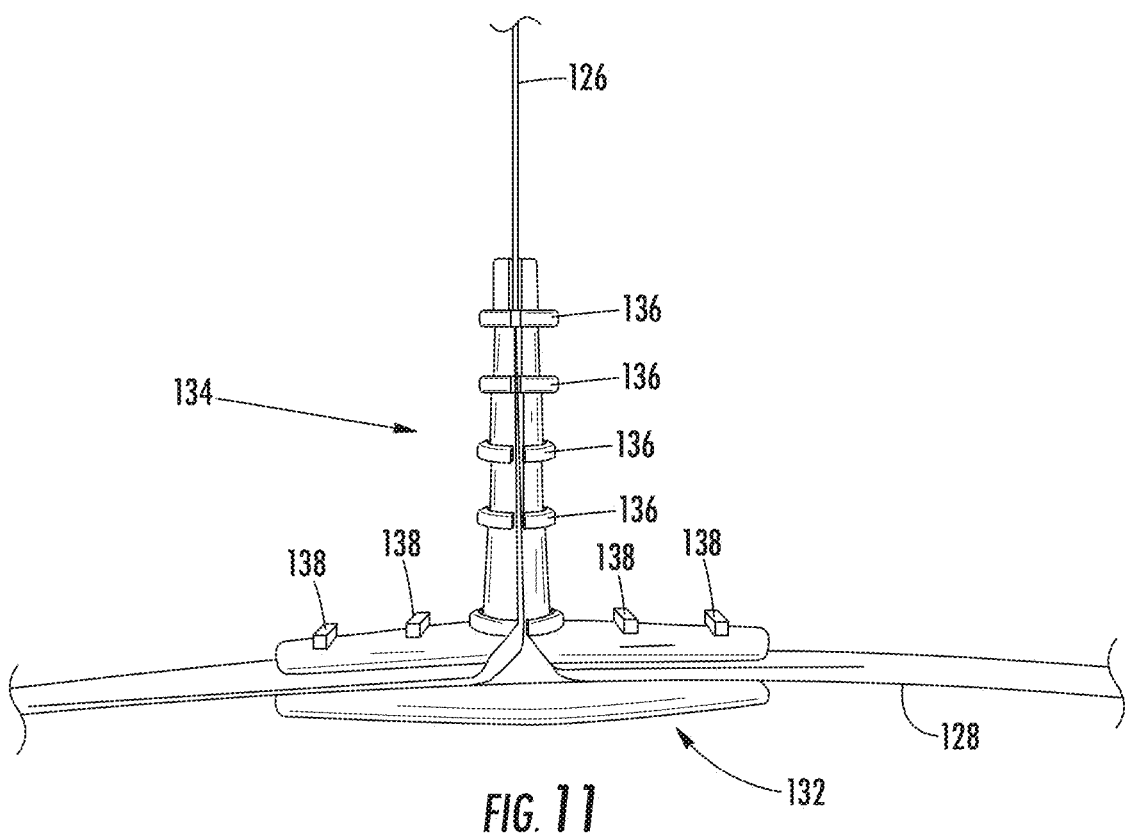
FIG. 11 is a top view of the transition plug with an optical fiber drop cable inserted into a routing channel of the transition plug and with an optical fiber extracted from the optical fiber drop cable and routed through a transition channel of the transition plug; the optical fiber is also protruding from the transition plug.

As shown in FIGS. 10 and 11, transition plug 130 is generally T-shaped. However, it is contemplated that in alternate embodiments, other suitable shapes may be used.

As shown, transition plug 130 includes a routing channel 132 and a transition channel 134. Routing channel 132 routes optical fiber drop cables 128 throughout MDU 10A exterior to the individual dwelling units (e.g., through hallways passing by individual dwelling units). The exterior of transition plug 130 around the routing channel 132 includes ribs 138, which are configured to engage with an exterior side 156 of a wall 152 (FIG. 13) that separates an individual dwelling unit from the hallway as discussed further below.

Figure 13:
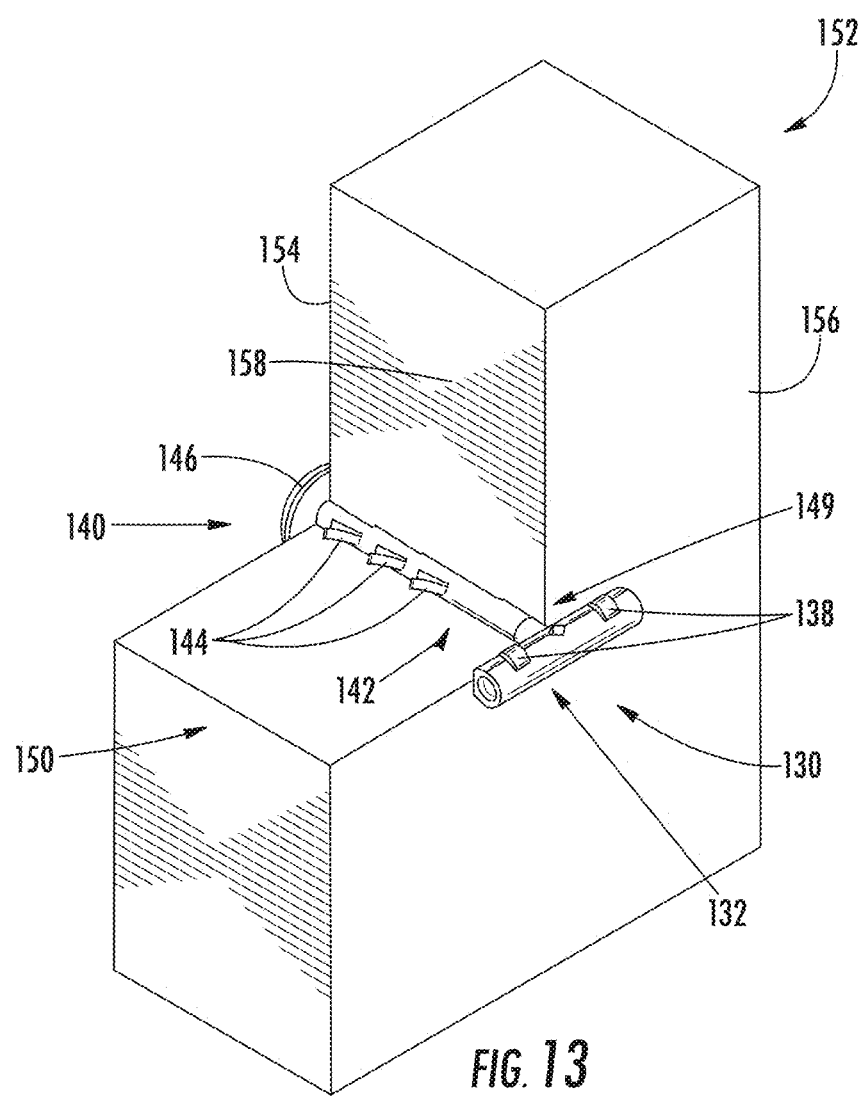
FIG. 13 is a perspective view of the transition assembly of FIG. 12 inserted into a wall separating a dwelling unit from a hallway of the MDU.

Transition channel 134 is in communication with routing channel 132, and transition channel 134 is substantially perpendicular to routing channel 132. However, it is contemplated that in alternate embodiments, other angles between the transition channel 134 and the routing channel 132 may be used. Transition channel 134 provides a route for individual optical fiber(s) 126 of optical fiber drop cable 128 to be directed into individual dwelling units and more particularly, to subscriber termination points 34 (FIG. 14, e.g., outlets) within individual dwelling units. The exterior of transition plug 130 around transition channel 134 includes protrusions 136 that engage with routing plug 140 (FIG. 12) when coupling routing plug 140 to transition channel 134 of transition plug 130. In one embodiment, transition plug 130 (via protrusions 136) telescopingly mates (e.g., snap fit) with an interior of routing plug 140. The coupling of transition plug 130 and routing plug 140 enables transition assembly 150 to be engageable with and adaptable to different thicknesses of wall 152 (FIG. 13).

As mentioned previously, routing plug 140 is coupled to transition plug 130 to form transition assembly 150. Routing plug 140 includes an entry channel 142, a plurality of anchor structures 144 along an outer surface of the entry channel 142, and an end plug 146 coupled to one end of the entry channel 142.

Entry channel 142 couples to transition channel 134 of transition plug 130 such that entry channel 142 is substantially coaxial with transition channel 134. More particularly, as shown in FIG. 13, when coupled to transition channel 134, entry channel 142 encloses transition channel 134 such that one end of entry channel 142 is adjacent to the junction where transition channel 134 and routing channel 132 intersect. In an alternate embodiment, entry channel 142 partially encloses transition channel 134 of transition plug 130. Entry channel 142 also functions to provide protective covering for the extracted optical fiber(s) 126 from optical fiber drop cable 128 as optical fiber(s) 126 travel through transition assembly 150 and into one of the dwelling units of the MDU 10A.

As mentioned previously, a plurality of anchor structures 144 are integrally formed with an outer surface of entry channel 142. Anchor structures 144 function to engage with a wall 152 (FIG. 13) to hold transition assembly 150 in place within wall 152.

End plug 146 engages with an interior side 154 of wall 152 once routing plug 140 is coupled to transition plug 130. End plug 146 cooperates with anchor structures 144 to provide additional stability for transition assembly 150 when inserted into wall 152.

To assemble transition assembly 150, routing plug 140 is coupled to transition plug 130. In particular, when coupling routing plug 140 and transition plug 130, transition channel 134 is positioned at least partially within entry channel 142, and protrusions 136 of transition plug 130 frictionally engage with an interior surface of entry channel 142 to secure the coupling of transition plug 130 with routing plug 140. In this way, transition channel 134 is within entry channel 142, and entry channel 142 provides a pathway for optical fiber(s) 126 to a dwelling unit of the MDU 10A.

To install transition assembly 150 within MDU 10A, an optical fiber drop cable 128 is prepared as discussed previously herein (e.g., with feeding tool 100, 200). Optical fiber drop cable 128 is then routed through transition plug 130. In particular, optical fiber drop cable 128 is routed through routing channel 132 of transition plug 130 as shown in FIG. 11. When optical fiber drop cable 128 is inserted into routing channel 132, the slit 119 in tube 122 (formed during preparation of optical fiber drop cable 128) is generally aligned with transition channel 134 of transition plug 130. In this way, optical fiber(s) 126 designated for an individual dwelling unit of MDU 10A is/are extracted from the optical fiber drop cable 128 (through slit 119) and inserted into transition channel 134 such that optical fiber(s) 126 protrude from transition plug 130 as shown in FIG. 11. In this configuration, transition plug 130 is directed into an aperture 149 (FIG. 13) of wall 152 that extends from an exterior side 156 of wall 152, through a middle section 158 of wall 152, and to an interior side 154 of wall 152. When inserted into aperture 149, transition channel 134 is positioned within a middle section 158 of wall 152, and optical fiber(s) 126 protruding from transition plug 130 extend into an individual dwelling unit. Thus, either before or during the positioning of transition plug 130 on wall 152, the optical fiber(s) 126 protruding from transition plug 130 are routed through aperture 149 as well.

Once transition plug 130 is arranged on wall 152 as previously described, routing plug 140 is inserted into aperture 149 from interior side 154 of wall 152. Routing plug 140 is also inserted over optical fiber(s) 126 that have been routed through wall 152 such that, once inserted into aperture 149, routing plug 140 encloses optical fiber(s) 126 and at least a portion of transition channel 134 within wall 152. Protrusions 136 on transition channel 134 engage with an interior surface of entry channel 142 to couple routing plug 140 with transition plug 130. Additionally, end plug 146 engages with interior side 154 of wall 152 and ribs 138 of routing channel 132 engage with exterior side 156 of wall 152 to secure transition assembly 150 to wall 152. Anchor structures 144 on entry channel 142 of routing plug 140 engage the middle section 158 of wall 152 to further secure transition assembly 150 to wall 152. In this configuration, optical fiber(s) 126 extend through entry channel 142 and end plug aperture 147 (FIG. 12) into the individual dwelling unit in question, and optical fiber(s) 126 can be further routed within the individual dwelling unit to designated subscriber termination points 34 (FIG. 14, e.g., outlets).

The method of installation described above can be repeated for other dwelling units. For example, transition assemblies 150 can be installed for other individual dwelling units such that optical fiber drop cable 128 and the corresponding optical fibers 126 for each dwelling unit are routed to the corresponding dwelling units as described herein. More specifically, a second transition plug 130 with a second optical fiber 126 is installed into a wall 152 of a second dwelling unit and a second routing plug 140 is coupled to the second transition plug 130 to form a second transition assembly 150 and to route the second optical fiber 126 into the second dwelling unit.

Figure 14:
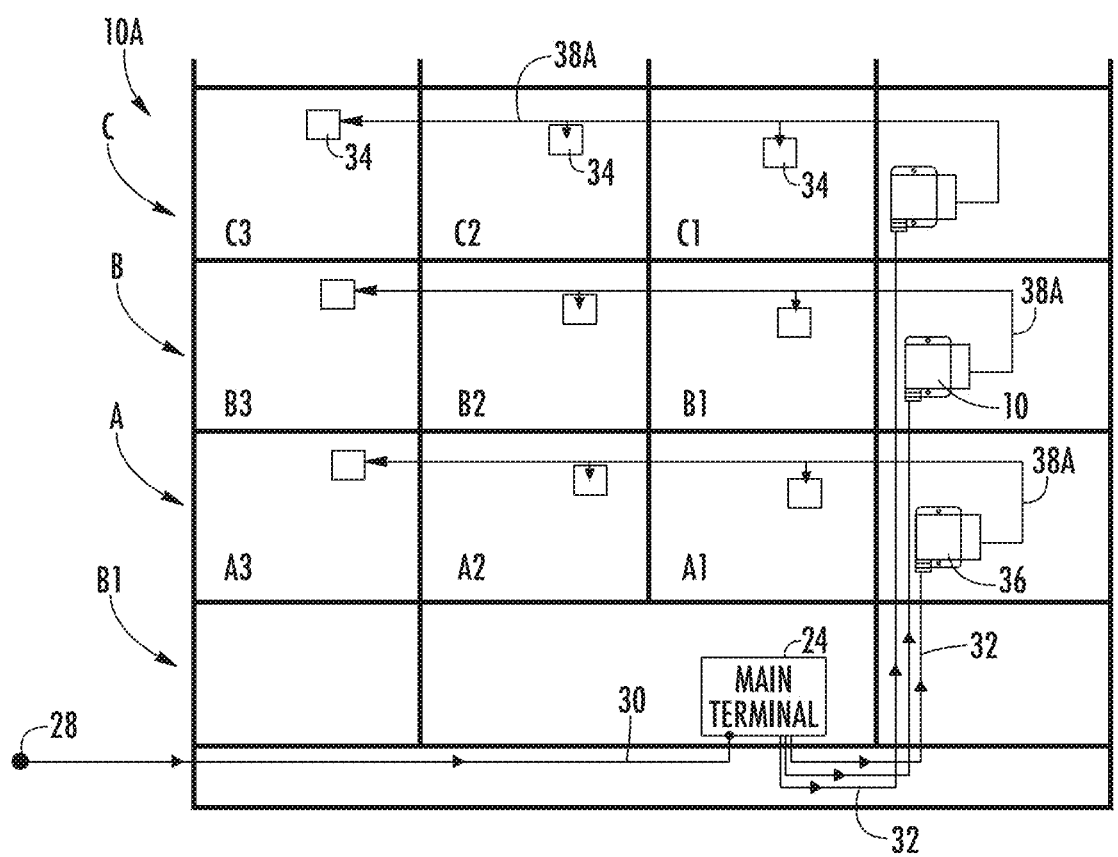
FIG. 14 is a side view of the multiple dwelling unit ("MDU") optical fiber routing map of FIG. 1 but with the application of the optical fiber drop cables and the transition assemblies of the present disclosure to illustrate the simplified optical fiber routing map within the MDU.

Referring now to FIG. 14, an optical fiber routing map of MDU 10A is shown with the application of assembling and routing (via transition assembly 150) optical fiber drop cables 128. Similar to MDU 10 of FIG. 1, MDU 10A is provided having a basement B1 and floors A, B, C with individual dwelling units A1-A3, B1-B3, and C1-C3 included in floors A, B, and C, respectively. As shown, a main terminal 24 is located in basement B1 and is connected to a distribution cable 28, which houses optical fiber(s) 30. Subscriber optical fibers 32 (e.g., multi-fiber cables comprising a plurality of optical fibers, such as ribbon fiber to provide one non-limiting example) extend from main terminal 24 and are optically connected to a fiber distribution terminal (FDT) 36 located on each floor A, B, C. FDTs 36 are provided to simplify the routing and installation of the optical fibers between the main terminal 24 and the subscriber termination points 34 by allowing the subscriber optical fibers 32 to be grouped between main terminal 24 and FDT 36 and then separated at FDT 36.

From FDTs 36, the subscriber optical fiber 32 is separated into a subscriber drop optical fiber cables 38A for each floor, in accordance with the method described herein. The subscriber drop optical fiber cable 38A is then routed to subscriber termination points 34 (e.g., adapter in a wall outlet, an adapter in a floor panel, an adapter behind a ceiling tile, or the like such that the subscriber can optically connect directly (or indirectly in some situations) to the subscriber optical fiber 32 in each dwelling unit A1-A3, B1-B3, and C1-C3 of MDU 10A via a transition assembly 150 installed into each dwelling unit as discussed previously herein. As shown in FIG. 14, the application of optical fiber drop cable preparation and optical fiber routing (via transition assembly 150) in MDU 10A yields an optical fiber routing map in which fewer optical fiber drop cables are needed for the individual dwelling units on each floor. For example, in certain MDUs depending on the number of rooms per floor, a single optical fiber drop cable can be used to route optical fibers to each individual dwelling unit of the MDU. Additional relevant details regarding the configuration of an optical fiber network and optical fiber routing in an MDU (e.g., MDU 10A of the present disclosure) can be found in U.S. Pat. No. 9,720,197, the disclosure of which is hereby incorporated by reference in its entirety.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A method of preparing and routing a plurality of optical fibers within a multiple dwelling unit ("MDU"), the method comprising:
  preparing an optical fiber drop cable by:
    creating a slit along a length of a tube; and
    directing the plurality of optical fibers through the slit such that the plurality of optical fibers extend within the tube along the length;
  arranging a transition plug on the optical fiber drop cable at a first location by:
    extending the optical fiber drop cable through a routing channel that extends through the transition plug, wherein the transition plug also includes a transition channel that communicates with the routing channel; and
    extracting at least one optical fiber from within the tube using the slit and extending the at least one optical fiber through the transition channel of the transition plug;
  routing the at least one optical fiber from the transition plug into a first dwelling unit of the MDU by extending the at least one optical fiber through a wall of the MDU; and mounting the transition plug to an exterior side of the wall of the MDU;
  wherein preparing the optical fiber drop cable further comprises:
    inserting the plurality of optical fibers into a first portion of a feeding tool;
    inserting the tube into a second portion of a feeding tool; and
    causing relative movement between the tube and the feeding tool so that a blade of the feeding tool creates the slit along the length of the tube, wherein the feeding tool directs the plurality of optical fibers through the slit and into the tube during the relative movement.

2. The method of claim 1, wherein:
routing the at least one optical fiber from the transition plug into the first dwelling unit of the MDU comprises extending the at least one optical fiber through a routing plug secured to the wall; and
mounting the transition plug to the exterior of the wall comprises coupling the transition plug to the routing plug to form a transition assembly that traverses the wall and provides a pathway for the at least one optical fiber from the exterior side of the wall to the interior side of the wall.

3. The method of claim 2, wherein the routing plug includes an entry channel extending from the interior side of the wall, and wherein the entry channel communicates with the transition channel of the transition plug when the transition assembly is formed.

4. The method of claim 2, wherein routing the at least one optical fiber from the transition plug into the first dwelling unit of the MDU is performed before coupling the transition plug to the routing plug.

5. The method of claim 1, wherein the transition plug arranged at the first location on the optical fiber drop cable is a first transition plug, the at least one optical fiber routed into the first dwelling unit is at least one first optical fiber, and the wall of the MDU is a first wall, the method first comprising:
  arranging a second transition plug on the optical fiber drop cable at a second location, wherein the second transition plug is similar to the first transition plug and arranged on the optical fiber drop cable in a similar manner such that, after arranging the second transition plug, at least one second optical fiber is extracted through the slit of the tube and extends through the transition channel of the second transition plug; and
  routing the at least one second optical fiber from the second transition plug into a second dwelling unit of the MDU by extending the at least one second optical fiber through the first wall of the MDU or a different wall of the MDU.

6. The method of claim 1, wherein the feeding tool further includes a wedge structure configured to engage with the tube and open the slit of the tube such that the plurality of optical fibers can be directed through the slit.

7. The method of claim 6, wherein the feeding tool includes a front aperture and a rear aperture between which passage is defined, wherein the wedge structure is proximate the front aperture.

8. The method of claim 6, wherein the wedge structure is integrally formed with a body of the feeding tool.

* * * * *